US012547329B2

(12) United States Patent
Jayaraman et al.

(10) Patent No.: US 12,547,329 B2
(45) Date of Patent: Feb. 10, 2026

(54) TECHNIQUES FOR MAPPING MEMORY ALLOCATION TO DRAM DIES OF A STACKED MEMORY MODULE

(71) Applicant: Intel Corporation, Santa Clara, CA (US)

(72) Inventors: Ramkumar Jayaraman, Bangalore (IN); Krishnaprasad H, Bangalore (IN); Robert A. Branch, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 17/689,816

(22) Filed: Mar. 8, 2022

(65) Prior Publication Data

US 2022/0188001 A1 Jun. 16, 2022

(51) Int. Cl.
*G06F 3/06* (2006.01)
(52) U.S. Cl.
CPC .......... *G06F 3/0631* (2013.01); *G06F 3/0604* (2013.01); *G06F 3/0673* (2013.01)
(58) Field of Classification Search
CPC .... G06F 3/0631; G06F 3/0604; G06F 3/0673; G06F 2212/1016; G06F 2212/1028; G06F 2212/1032; G06F 12/0284; G06F 12/0292; G06F 12/0607; G06F 15/7821; G11C 5/04; G11C 7/04; G11C 11/4076; G11C 11/409; G11C 11/4096; G11C 11/408
See application file for complete search history.

(56) References Cited

U.S. PATENT DOCUMENTS

| 7,058,750 | B1 * | 6/2006 | Rankin | G06F 13/4027 |
| | | | | 710/310 |
| 11,412,003 | B1 * | 8/2022 | Lyon | H04L 63/205 |
| 2008/0052483 | A1 * | 2/2008 | Rangarajan | G06F 12/0646 |
| | | | | 711/170 |

(Continued)

OTHER PUBLICATIONS

Eckert, Yasuko et al, "Thermal Feasibility of Die-Stacked Processing in Memory," AMD Research, Advanced Micro Devices, Inc., Dec. 9, 2014, 5 pages.

(Continued)

*Primary Examiner* — Hiep T Nguyen
(74) *Attorney, Agent, or Firm* — Compass IP Law PC

(57) ABSTRACT

Methods and apparatus for mapping memory allocation to DRAM dies of a stacked memory modules are described herein. Memory address ranges in a module employing 3DS (three dimensional stacked) DRAMs (Dynamic Random Access Memories) comprising stacked DRAM dies are mapped to DRAM dies in the module based on a layer of the DRAM dies, where dies in different layers have different thermal dissipation characteristic. Chunks of the memory address range are allocated to software entities such as virtual machines (VMs) and/or applications based on a memory access rate of the VMs/applications and the thermal dissipation characteristics of the DRAM die layers, wherein VMs/applications with higher memory access rate are allocated memory on DRAM dies with higher thermal dissipation. In one aspect, memory ranks are associated with respective die layers. In response to detection of change in access rates, memory may be migrated between ranks. Interleaving at multiple levels is also supported.

20 Claims, 11 Drawing Sheets

(56) References Cited

U.S. PATENT DOCUMENTS

| | | | |
|---|---|---|---|
| 2013/0275665 A1* | 10/2013 | Saraswat | G11C 7/04 |
| | | | 711/105 |
| 2019/0121723 A1* | 4/2019 | Walker | G06F 12/0223 |
| 2021/0089220 A1* | 3/2021 | Gkoulalas-Divanis | ...... |
| | | | G06F 21/6245 |
| 2022/0214974 A1* | 7/2022 | Li | G06F 12/0284 |

OTHER PUBLICATIONS

Yoon, Chongho et al., "3D die-stacked DRAM thermal management via task allocation and core pipeline control," IEICE Electronics Express, vol. 15, No. 3, Jan. 24, 2018, 12 pages.

\* cited by examiner

US 12,547,329 B2

TECHNIQUES FOR MAPPING MEMORY ALLOCATION TO DRAM DIES OF A STACKED MEMORY MODULE

BACKGROUND INFORMATION

Memory modules fabricated based on 3DS (three dimensional stacked) DRAM (Dynamic Random Access Memory) chips (also referred to herein as DRAMs) are popular in data centers due to high memory density, high performance, and low cost. 3DS DRAMs comprise vertically stacked individual DRAM dies on the same package using a 3D high bandwidth interconnect. A well-known problem with the 3DS DRAM is the issue of thermal dissipation (and possible thermal runaway) due to the restrictive heat dissipation from individual DRAM dies. With increased DRAM die temperatures, the memory controller increases the rate of refreshes to preserve the memory contents. Also, the memory controller needs to throttle the access to the memories to avoid conditions of thermal runaway. These mechanisms cause degradation in memory performance and bandwidth impacting the application workloads.

The issue of thermal dissipation (and possible runaway) also applies to other stacked DRAM modules such a processor-in-memory (PIM) modules, which integrate processing units such as CPUs or accelerators along with the memories on a single chip or in a single package. With the industry moving their SoC (System on Chip) designs to 3D IC (integrated circuit) packaging technologies such as Foveros and 3DFabric, it is expected that the issues of thermal dissipation will have a more pronounced impact. Significantly, with processor-in-memory (PIM) modules, the thermal dissipation issue becomes more pronounced as the power dissipation of processor modules in general is several orders of that of conventional memory modules.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
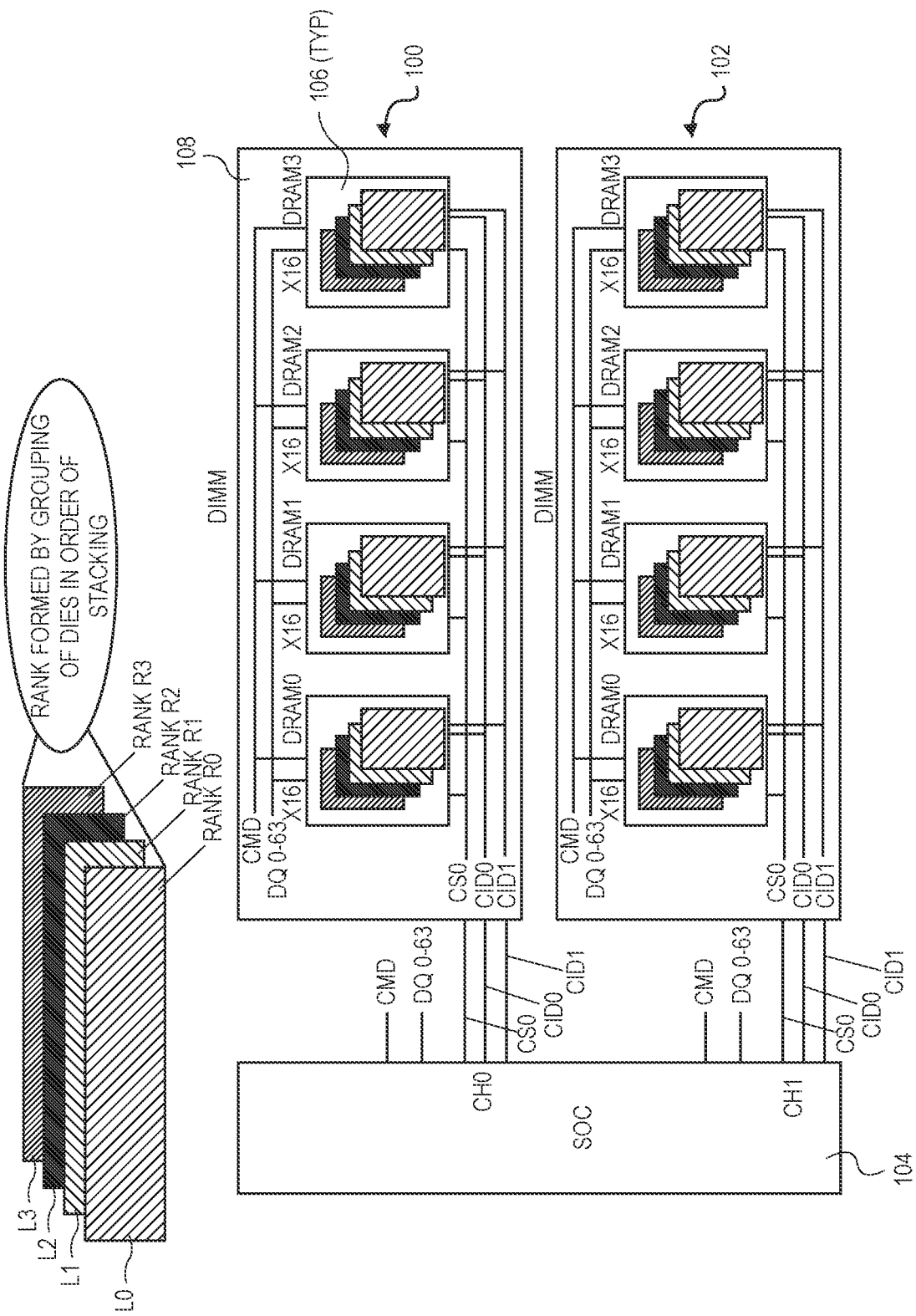
FIG. 1 is a schematic diagram of a pair of 3DS DRAM DIMMs coupled to a System on Chip (SoC)

Embodiments of methods and apparatus for mapping memory allocation to DRAM dies of stacked memory modules are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

References throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

FIG. 1 shows a pair of 3DS DRAM DIMMs 100 and 102 coupled to a System on Chip (SoC) 104. For example, SoC 104 may be a processor or CPU with an integrated memory controller with multiple channels, as depicted by CH0 and CH1. Each of DIMMs 100 and 102 include multiple 3DS DRAM chips 106 that are mounted on a printed circuit board (PCB) 108. Each 3DS DRAM chip is composed of four dies having respective layers L0, L1, L2, and L3. Also, the collection of outermost DRAM dies L0 across all the 3DS DRAM chips forms a memory rank (Rank R0) to which a range of address is allocated in the system memory map. Similarly, the other DRAM dies (L1 to L3) across the 3DS DRAM chips forms other respective memory ranks (Rank R1, Rank R2, and Rank R3) to which ranges of address are allocated.

Figure 2:
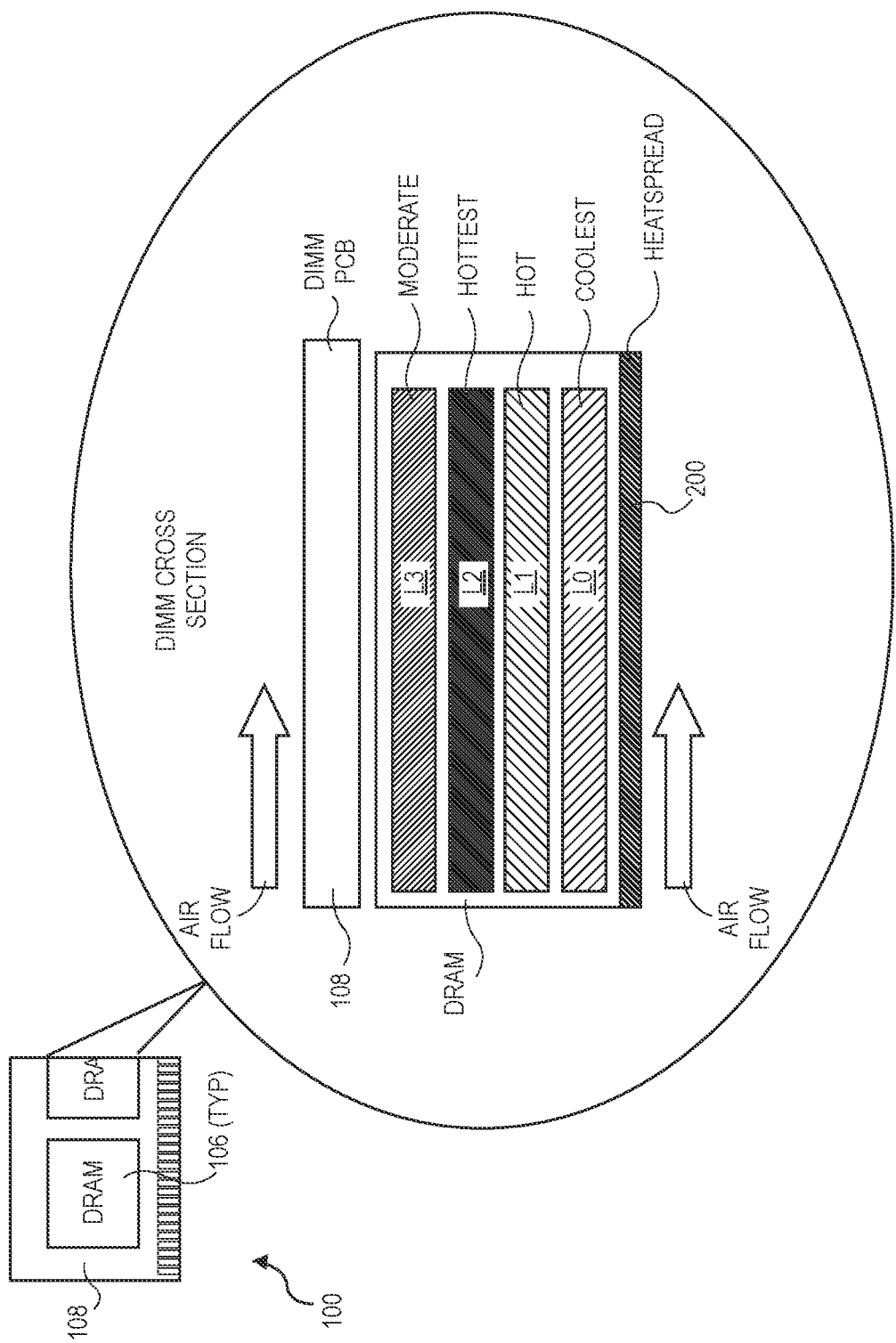
FIG. 2 shows a cross-section view of the 3DS DRAM structure.

A cross-section view of 3DS DRAM chip 106 is shown in FIG. 2. The structure includes PCB 108 to which stacked DRAM dies L3, L2, L1, and L0 are coupled, capped by a heat spreader 200. There are dielectric layers between the dies. As illustrated, the temperature of the outermost DRAM die (L0) is the coolest as compared to the other DRAM dies (L1 to L3). This is because the outermost DRAM dies L0 have the largest contact area with heat spreader 200, which enables the L0 dies to dissipate most of the heat they generate to the heat spreader using conductive heat transfer. The innermost DRAM die (L3) dissipates heat through the copper landing pads on PCB 108. The other inner layered DRAM dies (L1 and L2) primarily rely on through-silicon-vias (TSV) to L0 and L3 to dissipate the generated heat, which is restrictive. (While there is some conductive heat transfer across the dielectric layers, it is relatively small, in comparison.) Consequently, for a uniform memory access rate across the four DRAM dies, the temperature of the DRAM dies is given by: TL0<TL3<TL1<TL2, in the example.

Depending on the DRAM chip structure and other considerations, such as use of heat sinks and/or liquid cooling coupled to the top of the DRAM chips, the order of die temperatures might change. For example, heat sinks and/or liquid cooling may increase the thermal dissipation of dies L0 to effect a large enough temperature delta that results in dies in layer L1 having the second most heat dissipation (presuming an even memory access workload across the DRAM dies).

Current implementations of system software (BIOS firmware) do not differentiate between the varying thermal characteristics of the memory ranks, which as discussed above are collections of individual DRAM dies in the same layer across the 3DS DRAM. The memory reference code (MRC) in BIOS firmware scans across the memory channels and assigns a range of system addresses to each memory rank present in the detected 3DS DIMMs without consideration of the underlying DRAM die structure.

Figure 3:
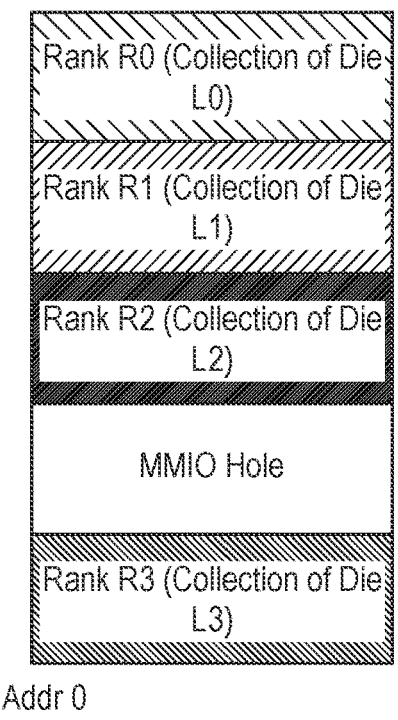
FIG. 3 is a diagram illustrating a first example of mappings between memory ranks and various software that does not consider thermal dissipation characteristics of the DRAM dies in the 3DS DRAMs.
Figure 3:
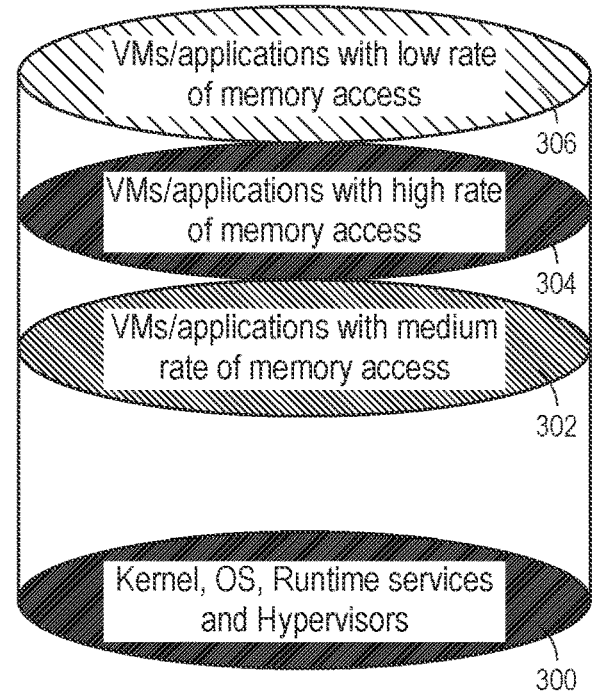

As an example, provided in FIG. 3 for illustration, the BIOS firmware maps the rank R3 (formed by DRAM die L3) at system address 0 followed by rank R2, rank R1 and rank R0 (which are formed by DRAM dies L2, L1 and L0 respectively). It is commonly observed that Operating System (OS) kernels, hypervisors, and other OS level run time services (as depicted by kernel, OS, runtime services and hypervisors 300) are mapped to the lower part of the system addresses (e.g., between the system address 0x0 and the start of the Memory-Mapped Input-Output (MMIO) hole). Other memory allocations to Virtual Machines (VMs)/applications are allocated based on availability of contiguous physical addresses above the MMIO hole.

In the example illustrated in FIG. 3, we assume three VMs with high (304), medium (302), and low (306) rates of memory accesses are allocated equal memories and occupy the three distinct memory ranks formed by the DRAM dies with similar thermal characteristics. As the thermal characteristics of the DRAM dies of the 3DS DRAM are ignored during the system address mapping, the VM/application with high rate of memory accesses can/might be mapped to a DRAM die with the lowest thermal dissipation, which can result in reduced memory bandwidth or thermal runaway conditions, observing under conventional approaches the VM-to-rank assignments are agnostic to the DIMM stacked-die structures.

As shown in FIG. 3, VMs/applications with medium rate of memory access 302 are mapped to rank R2 on dies L2 (the hottest layer), while VMs/applications with high rate of memory access 304 are mapped to rank R1 on dies L1 (hot temperature layer). Meanwhile, VMs/applications with low rate of memory access 306 are mapped to rank R0 on dies L0 having the best thermal dissipation (and thus the coolest layer).

As can be readily observed, these VMs/applications-to-rank mappings are less than ideal and will lead to uneven temperature distribution across the dies in the DIMM chips (presuming similar memory access rates for the VMs/applications). This, in turn, may require throttling of VMs/applications with high rate of memory access 304.

In accordance with aspects of the embodiments disclosed herein, a solution is provided under which VMs/applications are mapped to thermally appropriate memory ranks based on their memory access rates. This supports higher bandwidth by reducing throttling necessitated under the current approach and provides a more even temperature distribution across the dies in the DIMM chips. It also prevents thermal runaway conditions.

By mapping and consolidating the different dies of a 3DS DIMM as distinct memory address ranges, it is possible to offer differentiated services to the VM workloads. The hypervisor (or the OS) can then spawn VMs (or applications/workloads) allocating memory pages from a suitable address range depending on the application/workload's memory access characteristics. This ensures that the memory accesses to those thermally sensitive address ranges are controlled and thus the heating of those DRAM dies is well within the thermal bounds.

Figure 4:
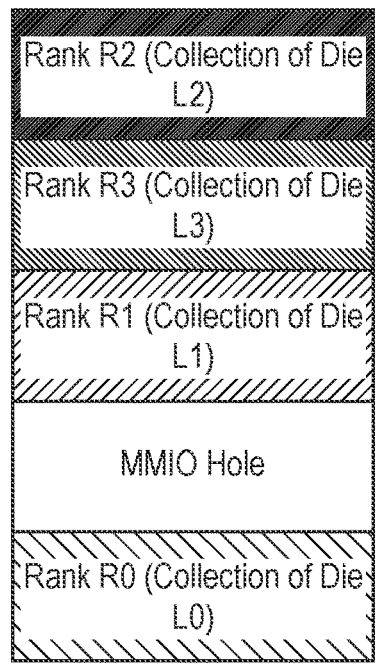
FIG. 4 is a diagram illustrating a second example of mappings between memory ranks and various software that considers thermal dissipation characteristics of the DRAM dies in the 3DS DRAMs.
Figure 4:
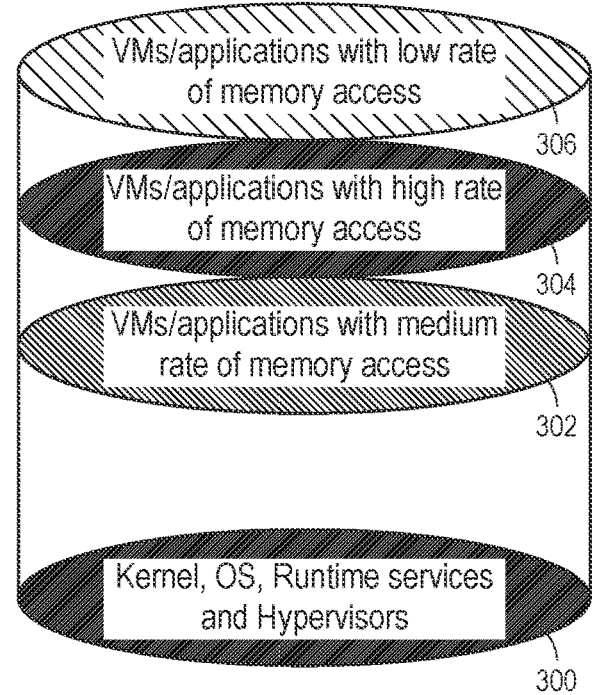

FIG. 4 shows the mapping of the VMs/applications to memory ranks under an implementation of the solution using the 3DS DRAM die thermal characteristics illustrated in FIGS. 1 and 2 and described above. In this example, the kernel, OS, runtime services and hypervisors 300 are mapped to rank R0 on dies L0, which has the highest rate of thermal dissipation and is (nominally) the coolest layer. VMs/applications with high rate of memory access 304 are mapped to rank R3 on dies L3 (the die layer with the second-best heat dissipation), while VMs/applications with medium rate of memory access 302 are mapped to rank R1 on dies L1.

In addition, VMs/applications with low rate of memory access 306 are mapped to rank R2 on dies L2 having the lowest rate of thermal dissipation (and which would nominally be the hottest layer given an even memory access workload across all die layers). Since VMs/applications with low rate of memory access 306 would cause a very marginal temperature rise, mapping to rank R2 is the optimum choice here.

Though the accesses to kernel, OS, and hypervisor memory space during the workload execution (through system calls and hyper-calls) are limited, we have mapped the kernel and hypervisor to the Rank 0 in FIG. 4, which has the highest thermal dissipation. This is done to provide a high system reliability, as any failure encountered during the execution of code in hypervisor or OS kernel space would result in a system hang and impacting the system's uptime. However, if a given workload's/VM's memory access characteristics guarantee a minimal access to kernel and hypervisor memory space, it is possible to reserve the Rank 0 in FIG. 4, which has the highest thermal dissipation to an aggressive VM/application with high rate of memory accesses. This order of the memory rank to system address mapping may be controlled using a BIOS configuration knob as decided by the user based on reliability and workload requirements. The representation given in FIG. 4 considers reliability as a criterion in mapping the memory ranks; however, this is merely an exemplary consideration, as other considerations may also be used to determine mappings.

By mapping VMs/application with relatively higher memory access to die layers (and associated ranks) with better heat dissipation and mapping the VMs/application with relatively lower memory access to die layer (and associated ranks) with lower heat dissipation, the temperature increases of the individual DRAM dies are well-controlled and within remain within thermal their bounds.

Figure 5:
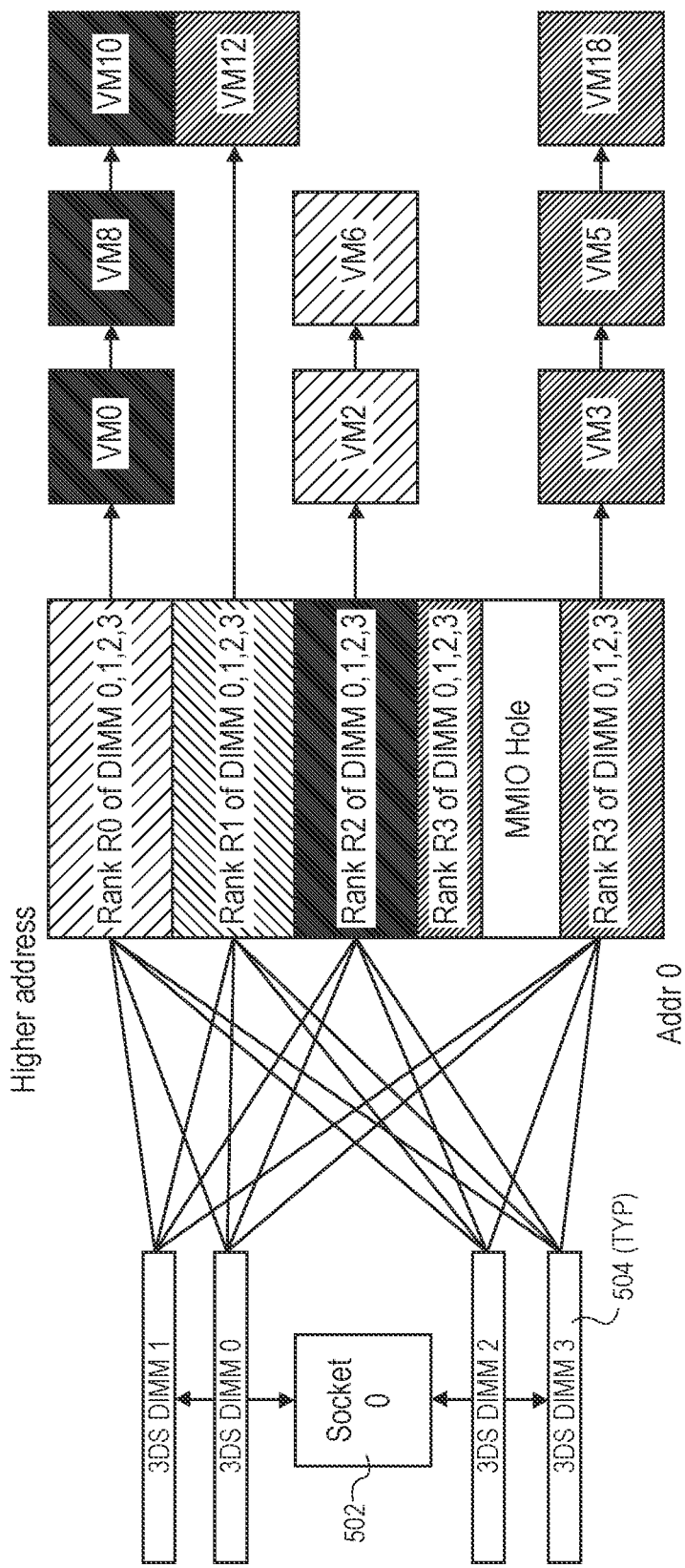
FIG. 5 is a diagram illustrating an example of rank to VM mappings for a system employing a socket coupled to four 3DS DRAM DINIMs.

In server platforms having multiple 3DS DRAM modules used in environments such data centers, the system firmware maps memory ranks with similar thermal characteristics to a contiguous address range in system memory map, as shown by a server platform 500 in FIG. 5. The platform includes a single socket 502 (Socket 0) coupled to four 3DS DIMMs 504 (labeled DIMM 0, DIMM 1, DIMM 2, and DIMM 3. In this example, each MINIM 504 includes multiple DIMM chips comprising four stacked dies (also referred to a 4H, meaning four "high"). The dies on the MINIM chips are associated with ranks R0, R1, R2 and R3 by die layers L0, L1, L2, and L3, as before.

A server platform may support execution of multiple VMs (or containers, Kubernetes® Pods, etc.). As shown in FIG. 5, selected memory chunks allocated for selected VMs are mapped to memory ranges within a rank based on the memory access rates of the VMs. In this example, VM0, VM8 and VM10 have the highest memory access level and thus are allocated memory ranges in rank R0. VM3, VMS, VM18, and VM12 have medium memory access rates. In this example, VM3, VMS, VM18 are allocated respective chunks in memory ranges in rank R3, while VM13 is allocated a chunk(s) in a memory range in rank R1. VM2 and VM6 have a low memory access rate and are thus allocated chunk(s) in memory range(s) in rank R2.

As illustrated by the example in FIG. 5, this approach allows multiple VMs/applications to be mapped to the memory address ranges based on their memory access rates. In one embodiment the system (BIOS) firmware provides the necessary information to the OS/hypervisor to perform these memory allocations in a thermal optimized manner. Further examples of memory allocation schemes are discussed and illustrated in the flowcharts and diagrams below.

System Level Flow

Figure 6:
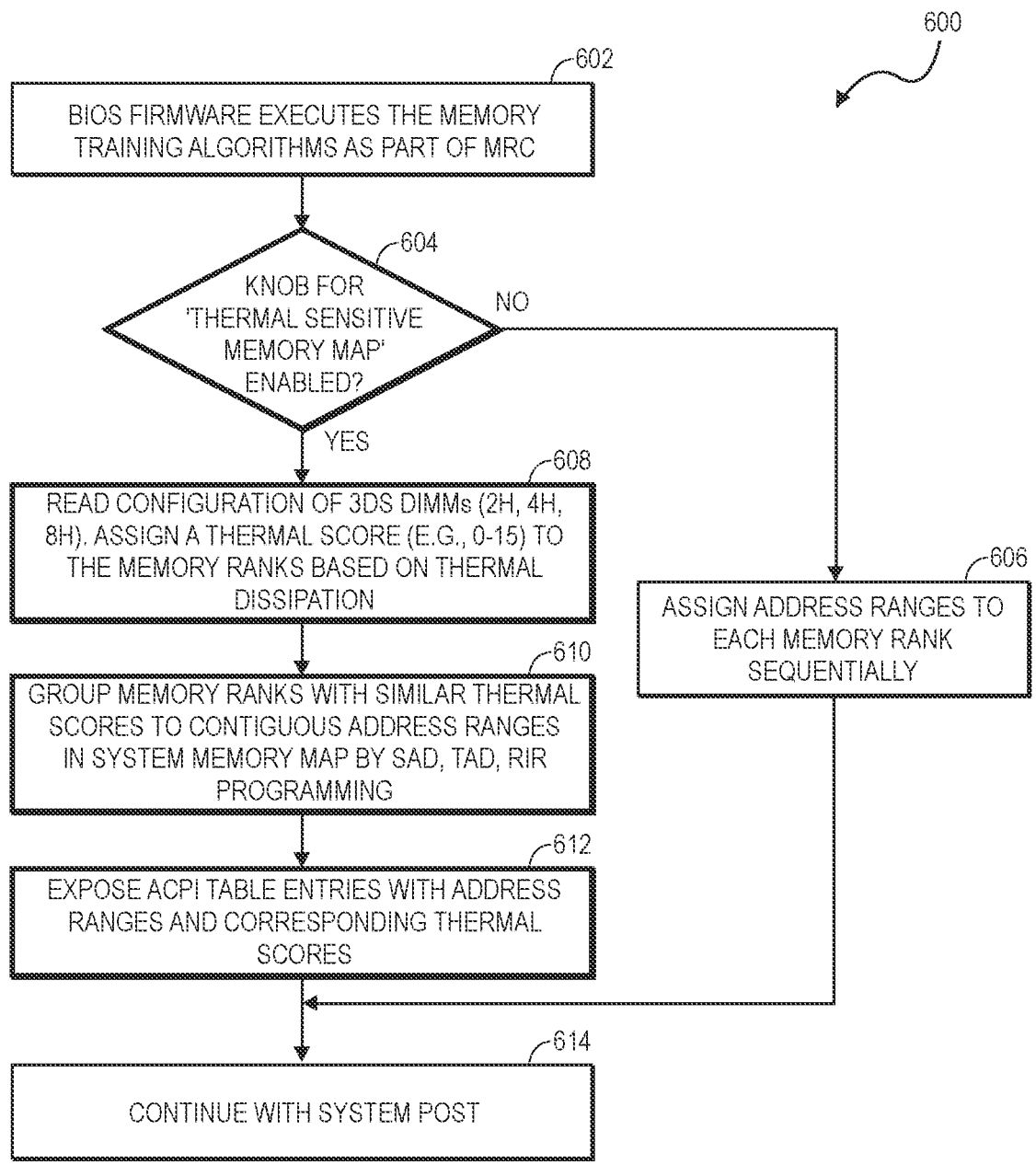
FIG. 6 is a flowchart illustrating operations and logic performed by BIOS firmware to generate a system memory map for a system employing 3DS DRAM DIMMs and for generating an ACPI table with mappings of address ranges to thermal score, according to one embodiment.

FIG. 6 shows a flowchart 600 illustrating operations and logic implemented by BIOS firmware, according to one embodiment. In an aspect of one embodiment, a new BIOS "knob" is added to enable this feature in MRC. After the execution of memory training algorithms, the MRC uses the configuration of 3DS DIMM (e.g., 2H, 4H, or 8H) and assigns a thermal score to each detected memory rank. In one embodiment, the thermal score is an indication of thermal dissipation ranging from 0 to 15 based on the individual DRAM die's geometrical position in the 3DS DRAM chip. Higher thermal score is an indication of higher thermal dissipation. For instance, the thermal scores of the 4H stacked 3DS DIMM shown in FIGS. 1 and 2 are provided in the following TABLE 1.

TABLE 1

| Memory rank (Collection of individual DRAM dies) | Thermal Score | Notes |
|---|---|---|
| Rank R0 | 15 | Layer of outermost die in contact with heat spreader. Maximum heat dissipation |
| Rank R3 | 7 | Layer of innermost die in contact with the solder bumps. |
| Rank R1 | 3 | Layer of DRAM dies in contact with L0 |
| Rank R2 | 0 | Layer of DRAM dies in contact with L3 |

The blocks with a white background in flowchart 600 are conventional operations, while the blocks with a bold outline are new. The flow begins in a block 602 where the BIOS firmware executes memory training algorithms as part of MRC. In a decision block 604 a determination is made to whether a knob for 'thermal sensitive memory map' is enabled. If it is not, conventional operations are performed as shown with the logic proceeding to a block 606 in which address ranges are assigned to memory ranks sequentially, and then the logic proceeds to a block 614 in which the system Power On Self Test (POST) continues.

If the knob for 'thermal sensitive memory map' is enabled, the answer to decision block 604 is YES and the logic proceeds to a block 608 in which the configuration of the 3DS DIMIMs are read (e.g., whether they employ 2H, 4H, or 8H (or other) stacked die structures). A thermal score (e.g., 0-15) is also assigned to the memory ranks based on their thermal dissipation characteristics, such as defined in TABLE 1 above.

Next, in a block 610 the MRC groups the memory ranks of similar thermal score to a contiguous memory region in the system memory map by setting the SAD, TAD and RIR registers. SAD (Source Address Decode) maps the system address to a specific memory channel. TAD (Target Address Decode) maps system addresses to memory channel address. RIR (Rank Interleave Register) translates a memory channel address to a rank address. Further details of the SAD, TAD, and RIR operations are discussed below with reference to flowchart 1000 in FIG. 10.

In a block 612, the BIOS firmware exposes ACPI (Advanced Configuration and Power Interface) table entries with address ranges and thermal scores associated with the address ranges so that software entities such as hypervisors and/or the OS can use this information for handling the memory allocation requests in a thermal favorable manner. A sample of this ACPI table entries are provided below in TABLE 2.

TABLE 2

| Signature | MTDT |
|---|---|
| Number of address ranges | 4 |
| Address Range 1 Start | 0x0 |
| Address Range 1 End | 0x17FFFFFFF |
| Address Range 1 Thermal score | 15 |
| Address Range 2 Start | 0x180000000 |
| Address Range 2 End | 0x27FFFFFFF |
| Address Range 2 Thermal score | 7 |
| Address Range 3 Start | 0x280000000 |
| Address Range 3 End | 0x37FFFFFFF |
| Address Range 3 Thermal score | 3 |
| Address Range 4 Start | 0x380000000 |
| Address Range 4 End | 0x47FFFFFFF |
| Address Range 4 Thermal score | 0 |

It is also possible for the system firmware to publish the above data in an existing ACPI table such as HMAT (Heterogenous Memory Attribute Table) to indicate the OS the preferred memory range instead of using a new format for the ACPI table (such as shown in TABLE 2). The thermal score in this case would be tweaked to the memory bandwidth scores that the HMAT table uses.

Following block 612, the logic then proceeds to block 614 to continue the system POST.

Figure 7:
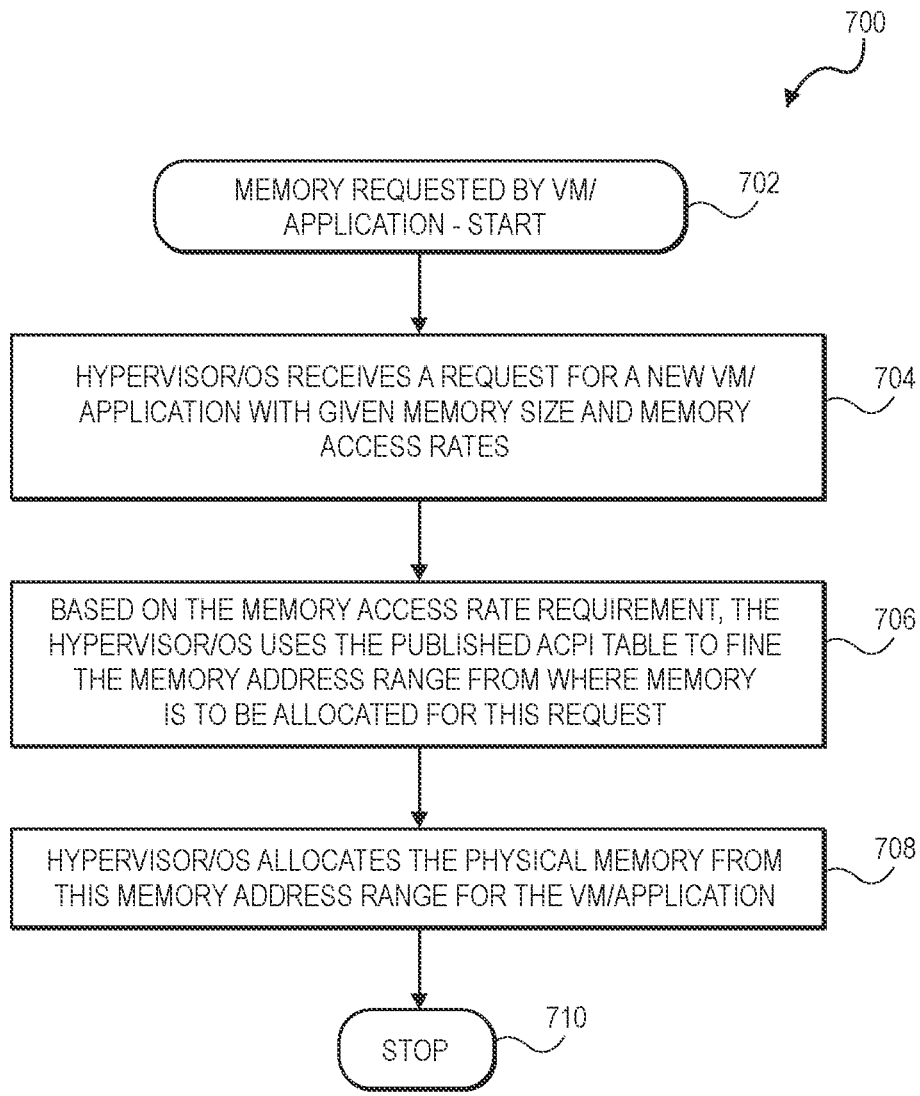
FIG. 7 is a flowchart for the memory allocation performed by the hypervisors/OS, according to one embodiment.

A flowchart 700 for the memory allocation performed by the hypervisors/OS, according to one embodiment, is shown in FIG. 7. When a new VM/application is spawned by the hypervisor/OS, the hypervisor/OS needs to allocate page frames in physical memory space for the VM/application to begin with its execution (also referred to herein as memory chunks). Most of the cloud service providers (CSP) and data centers provide options to the end-users to choose a VM instance based on the workload characteristics. For instance, Microsoft® Azure® offers VMs based on the categories of general purpose, compute optimized, memory optimized, storage optimized, etc. Similarly, Amazon® offers similar categories and even recommends certain types of VM instances based on workloads (MySQL®, Memcached, Redis, HANA, etc.). Thus, it is fair to assume that the memory access rates of a given workload/application is known apriori to the CSPs. In cases where the memory access rates are not known, this can be evaluated by using common tools such as profilers or by assuming a worst-case estimate (high memory access rate).

With reference to FIG. 7, flowchart 700 begins in a start block 702 in which memory is requested by a VM or application. In a block 704, the hypervisor or OS receives a request for a new VM/application with a given memory size and memory access rates. Based on the memory access rate requirement, the hypervisor/OS uses the published ACPI table to find the memory address range for where memory is to be allocated to meet the request, as shown in a block 706. In a block 708, the hypervisor/OS allocates the physical memory from the memory address range for the VM/application, followed by the process completing and exiting in an exit block 710.

Figure 8:
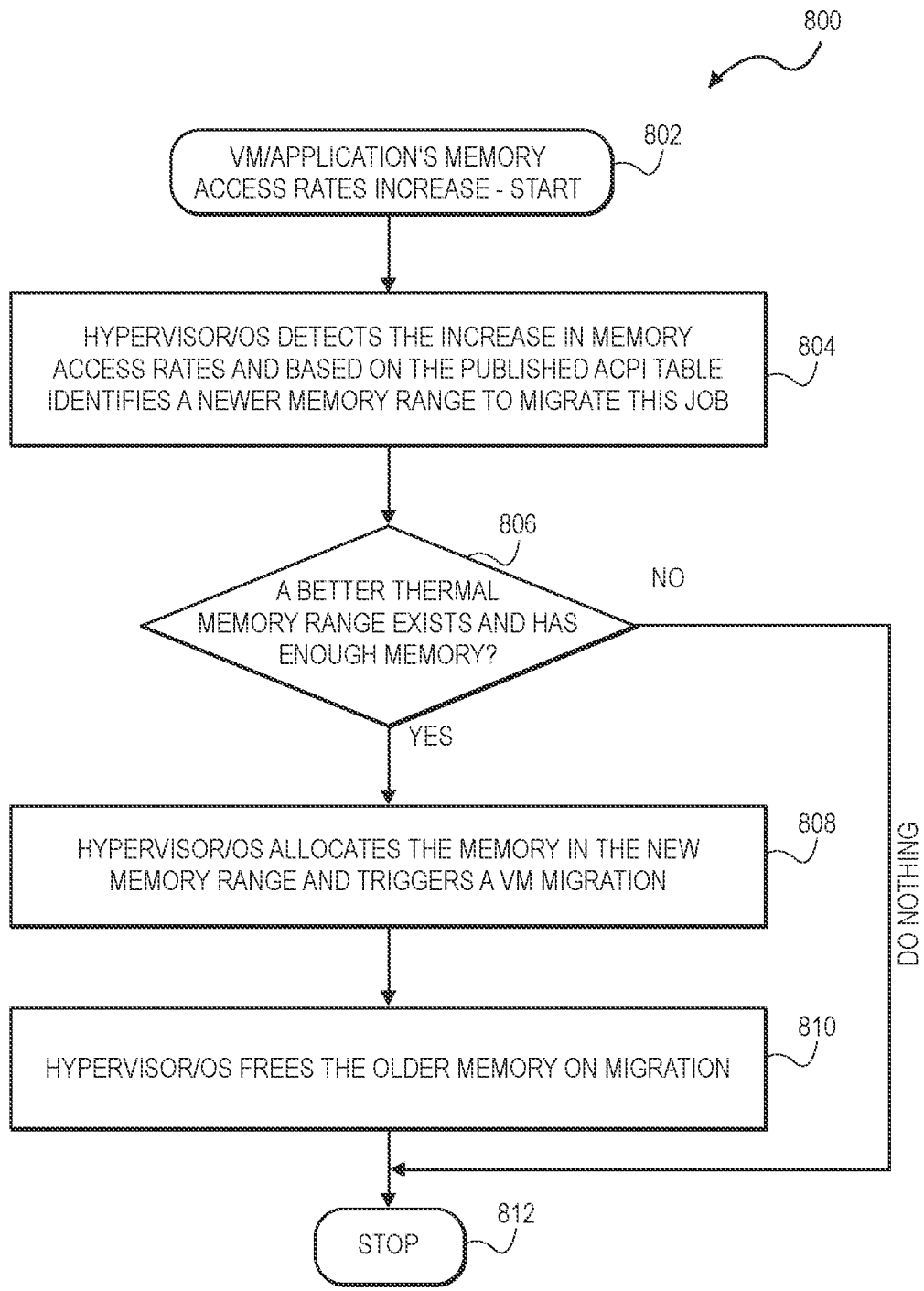
FIG. 8 is a flowchart illustrating operations and logic performed to implement a VM migration, according to one embodiment.

In cases where the VM's or application's memory access rate is found to be increasing, it is possible for the CSP to either limit the accesses based on the service level agreement (SLA) or migrate that given instance to a better thermal memory rank which would allow higher rate of memory accesses without considerable heating. The VM/application migration path is explained in flowchart 800 in FIG. 8.

The flow begins in a start block 802 in which the VM/application's memory access rate(s) increase. In a block 804, the hypervisor/OS detects the increase in memory access rate(s) and based on the published ACPI table identifies a memory range with available memory space to migrate this job or task associated with the VM/application.

In a decision block 806, a determination is made to whether a better thermal memory range exists and has enough available memory to support the migration. If no memory range meets the criteria of decision block 806, the answer is NO and the logic proceeds to an exit block 812. If the criteria are met, the answer is YES and the logic proceeds to a block 808 in which the hypervisor/OS allocates the memory in the new (to be migrated to) memory range and triggers a VM migration. After the VM migration is completed, the hypervisor/OS frees the older memory (previously used prior to VM migration), as shown in a block 810.

There exist several traffic management techniques in some of today's processor architectures that allows for regulation of memory traffic at a memory controller level or at a core/coherent fabric level. For example, an exemplary and non-limiting set of traffic management techniques is shown in TABLE 3 below.

TABLE 3

| Existing traffic management technique | Enforced at | Remarks |
| --- | --- | --- |
| Memory throttling, RAPL (running average power limiter) | Memory controller level | Activated on DIMM's temperature reaching a preset value |
| Memory bandwidth monitoring (Intel ® RDT) | Coherent fabric/core level | Limit the accesses to a given workload based on user programmed setting |

Based on the traffic management scheme, the CPU regulates the accesses to the main memory on fulfillment of certain conditions. For instance, the memory bandwidth allocation (MBA) is a feature provided in Intel® CPUs under the umbrella of Intel® Resource Director Technology (RDT) which is used to control how memory bandwidth is allocated across different workloads/VMs. A CPU core is provided with a programmable request rate controller which limits the accesses to main memory on a per unit interval basis. In today's use-cases, the data center customers and CSPs use this memory bandwidth allocation feature to ensure fairness to memory resources among the competing VMs/workloads.

Generally, the concepts described herein can be used in combination with memory bandwidth allocation features to regulate the temperature of individual memory dies of a 3DS DIMM. In one such implementation, it is possible for the hypervisor or Virtual Machine Manager (VMM)/OS to continuously monitor the temperature of the memory ranks present in a 3DS DIMM. (In the following description, the term VMM is used; it will be recognized that a hypervisor is a type of VMM and may be used in a similar manner.) When the temperature of a memory rank exceeds the normal operating temperature range, the VMM/OS programs an aggressive limit to the programmable request rate controllers available in memory rank's associated cores. This limits the memory accesses to that physical memory rank and regulates the temperature of the memory rank. This is explained and illustrated in the flowchart 900 in FIG. 9. Similarly, it is possible for the VMM/OS to trigger the memory throttling or RAPL (running average power limiter) feature via PCODE mailbox communication instead of MBA's programmable request rate controller, which results in similar control of temperature but at a memory controller level.

If none of the mitigation techniques described above succeed in regulating the temperature of the memory rank, the VMM/OS can perform a live VM migration to a better memory rank in terms of thermal dissipation for that VM/workload.

Figure 9:
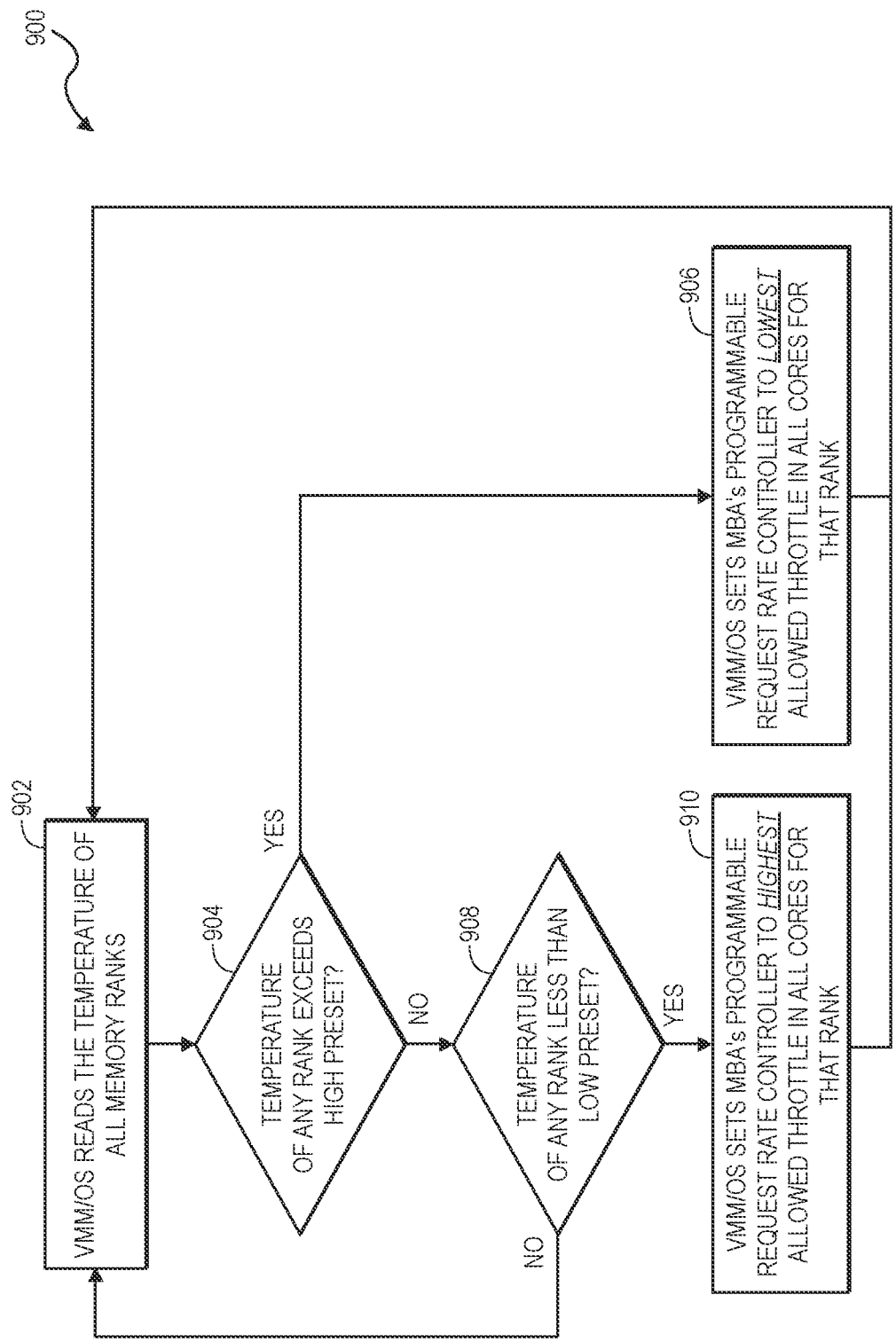
FIG. 9 is a flowchart illustrating operations and logic performed to change request rate controllers in consideration of changes to memory rank temperatures, according to one embodiment.

As shown in FIG. 9 the flow begins in a block 902 in which the VMM/OS reads the temperature of all memory ranks. In a decision block 904 a determination if made to whether the temperature of any rank exceeds a preset high temperature. If the answer is YES, the logic flows to a block 906 in which the VMM/OS sets the MBA's programmable request rate controller to the lowest allowed throttle in all cores for that rank. The logic then loops back to block 902 to begin a next iteration of the flow.

If the answer to decision block 904 is NO, the logic proceeds to a decision block 908 in which a determination is made to whether the temperature of any rank is less than a low preset temperature. If the answer is NO, the logic then loops back to block 902 to begin the next iteration of the flow. If the answer is YES, the logic flows to a block 910 in which the VMM/OS sets the MBA's programmable request rate controller to the highest allowed throttle in all cores for that rank. The logic then loops back to repeat the flow during a next iteration.

Algorithm for Selecting the Best Thermal Memory Rank Given a Workload

The hypervisor/OS employs an algorithm to find the best thermal memory rank for a given VM/application based on its memory access rate, which allow the execution of VM/application but with controlled thermal heating. The use of current temperature data from the memory module in addition to the thermal scores as given in flowchart 900 enhances the performance of this algorithm.

Due to the cost-prohibitive nature of memory hardware market, DIMM vendors (currently) do not provide a temperature sensor per DRAM die in 3DS DIMMs. Rather, a single temperature sensor is provided close to base die of the 3DS DRAM. It is possible to use thermal flow models provided by the DRAM chip manufacturer to approximately deduce the temperatures of the other memory dies using the base die temperature and memory access rate. For example, let us assume a CSP's hypervisor receives a request to spawn a VM capable of supporting high rates of memory access and the system's thermal scores and current temperatures of the individual memory ranks are as given below in TABLE 4. Instead of choosing Rank R0, which has a higher temperature due to workload execution, it might be a better option to choose Rank R3, whose temperature is much lower as well as allow for reasonable thermal dissipation.

TABLE 4

| Memory rank (Collection of individual DRAM dies) | Thermal Score | Current temperature | Notes |
|---|---|---|---|
| Rank R0 | 15 | 65 C. | Layer of outermost die in contact with heat spreader. Maximum heat dissipation but already high temperature due to workload execution. |
| Rank R3 | 7 | 22 C. | Layer of innermost die in contact with the solder bumps. |
| Rank R1 | 3 | 35 C. | Layer of DRAM dies in contact with R0. More temperature due to neighbor's high temperature. |
| Rank R2 | 0 | 24 C. | Layer of DRAM dies in contact with R3 |

The use of current temperature in addition to thermal scores of the memory ranks present a closed-loop approach in choosing the best memory range for a given VM/application. In addition to using table-based models, other thermal models using well-known thermal equations may also be used.

Impact and Interaction with Memory Interleaving Feature

The embodiments disclosed herein have a small impact on how physical memory is interleaved within the system. Algorithms that perform the computations and subsystem programming to support memory interleaving will generally need only minor modification to support the interleaving in combination with the principles and teachings disclosed above. In one embodiment, memory interleaving is still performed at the socket, memory controller, channel, and rank levels.

Interleaving of coherent memory organizes the system address space into a set of interleaved system address ranges where each range is represented with a Source Address Decode (SAD) rule. Under a conventional approach, all physical ranks of each populated DIMM are considered when creating the set of SAD rules. All coherent memory is interleaved without considering the thermal score of each physical rank. Under the embodiments herein, a subset of physical ranks based on thermal scores is considered when creating the SAD rules. This process is repeated until all coherent memory is interleaved. With this approach the set of interleaved system address ranges will be organized based on the rank thermal scores.

Figure 10:
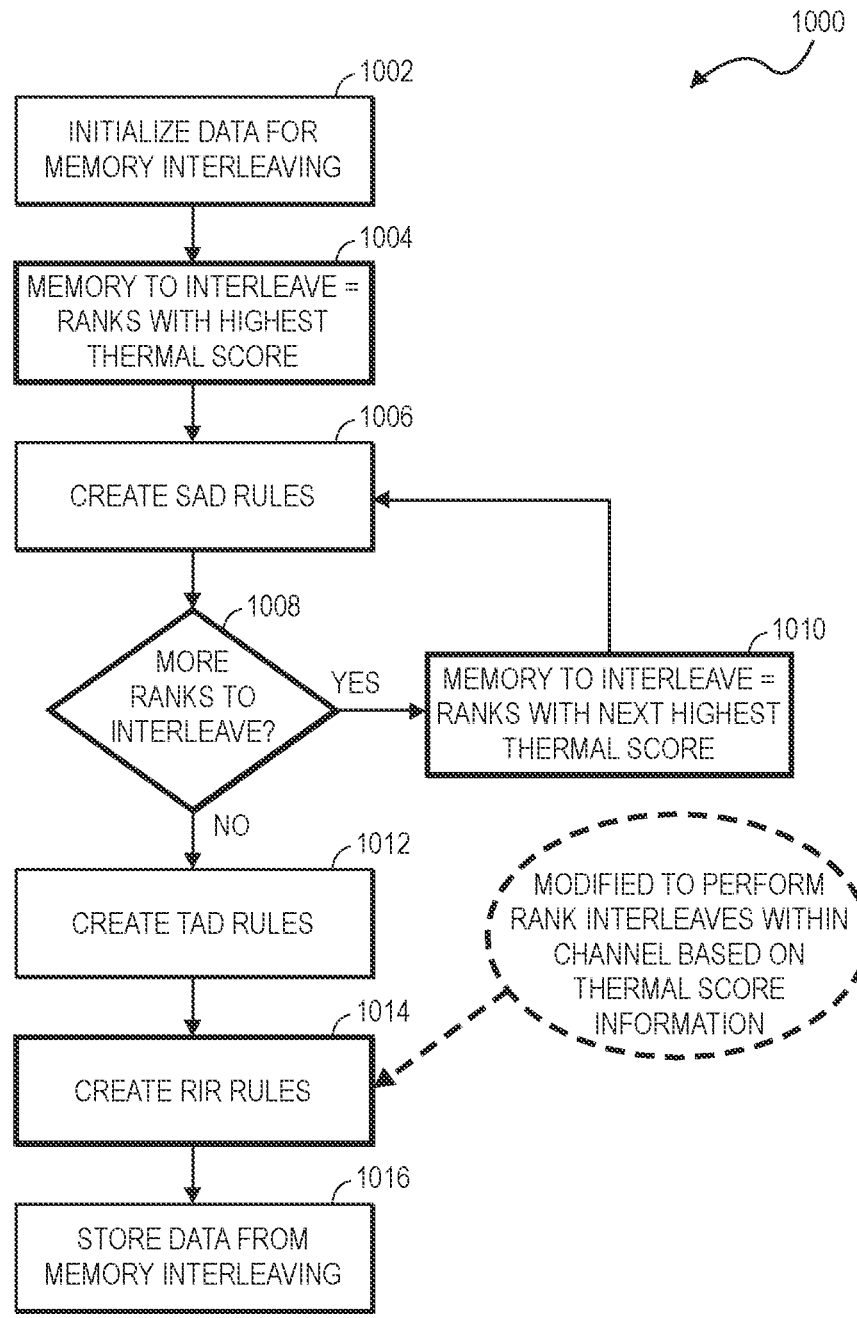
FIG. 10 is a flowchart illustrating operations and logic employed to interleave chunks of memory across at the memory controller level, the memory channel level, and the memory rank level, according to one embodiment.

Flowchart 1000 of FIG. 10 illustrates operations and logic for how the SAD, TAD and RIR interleave registers are programmed, according to one embodiment. The blocks with a white background are the conventional operations used for memory interleaving, while the blocks with a bold outline are new to this solution.

The process begins in a block 1002 in which the data for memory interleaving are initialized. In a block 1004 the memory to interleave begins with the rank(s) with the highest thermal score. In a block 1006 the SAD rules are created describing system address ranges and the memory controller targets or sockets associated with the ranges. As depicted by the determination in a decision block 1008 and a block 1010, the process of creating SAD rules is repeated for each of the remaining ranks based on thermal scores, proceeding from the next highest thermal score per rank to the lowest (for the last rank)

Once SAD rules are created for all ranks, TAD rules are created describing the translation of the system address to a memory controller channel address. This is depicted in block 1012. RIR rules are then created in a block 1014. RIR rules are used to translate a memory controller channel address to a rank address. Creation of the RIR rules is modified (relative to the conventional approach) to perform rank interleave within the channel based on thermal score information. The SAD, TAD, and RIR rules are then stored along with any relevant associated data in a block 1016.

Figure 11:
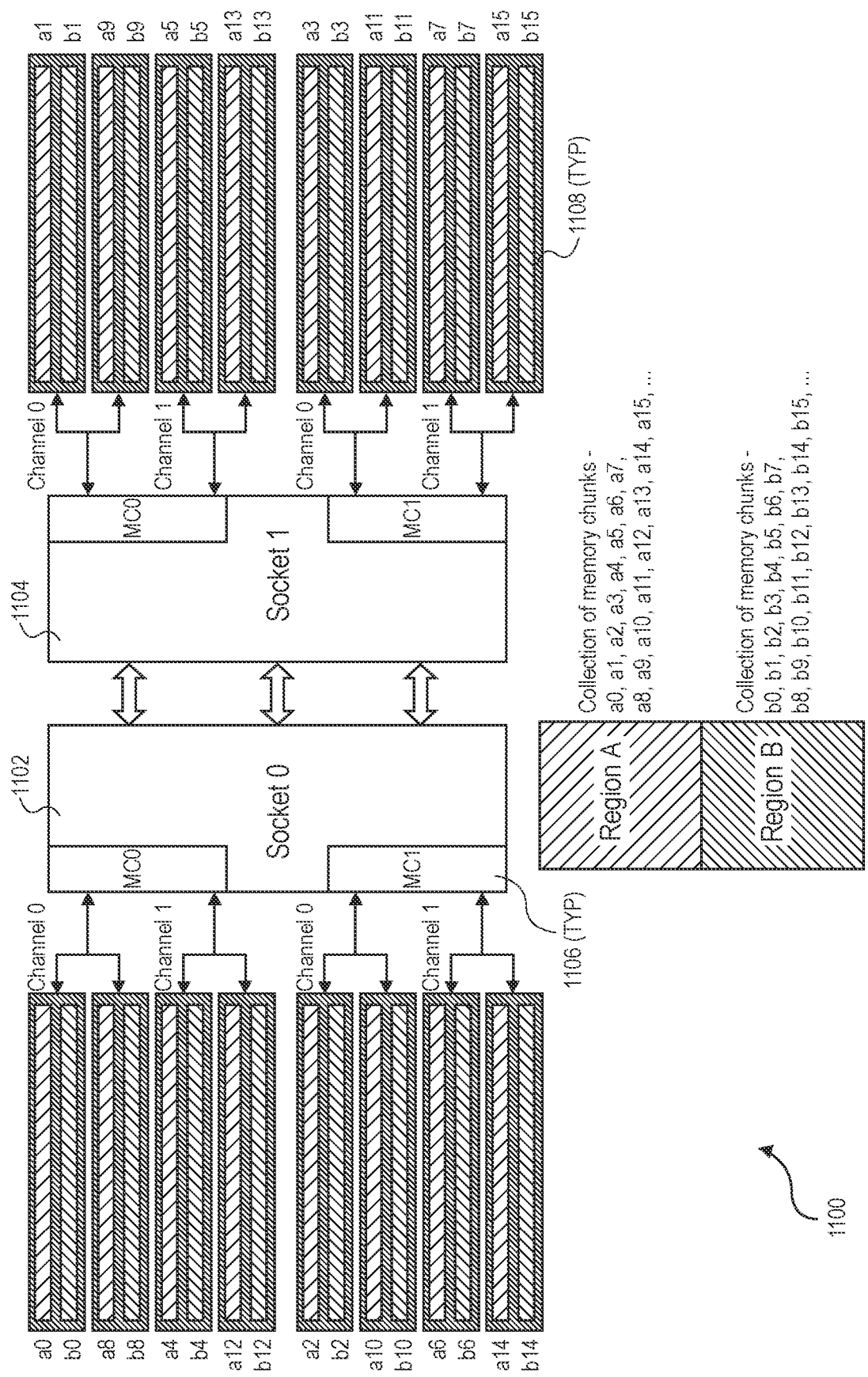
FIG. 11 is a diagram illustrating an example of memory chunk interleaving.

An example of applying the foregoing for a system 1100 with socket interleaving, memory controller interleaving, channel interleaving, and rank interleaving is shown in FIG. 11. System 1100 include a pair of sockets 1102 and 1104 (also labeled Socket 0 and Socket 1). Each socket includes a pair of memory controllers 1106 (labeled MC0 and MC1). Each memory controller is connected to four 2H 3DS DIMMs 1108 via a pair of channels 0 and 1, as illustrated. As discussed above, 2H 3D DIMMs employ two stacked dies per DIMM chip.

In FIG. 11, Region A in the system memory map correspond to a memory range with better thermal score (better thermal dissipation properties) than Region B in the system memory map. Region A comprises of memory chunks a0, a1, a2, a15 . . . and Region B comprises of memory chunks b0, b1, b2, . . . b15 . . . .

The SAD, TAD and RIR are setup by the system firmware such that the memory chunks given by a0, a1, a2, . . . are mapped to the outer DRAM chip die layers of the 2H 3DS DIMMs (better thermal score). Similarly, the memory chunks given by b0, b1, b2, . . . are mapped to the inner DRAM chip die layers of the 2H 3DS DIMMs (lesser thermal score). It can also be observed that the memory chunks given by a0, a1, a2, . . . and b0, b1, b2, . . . are distributed across the sockets, controllers, channels and ranks in this memory interleaving feature example.

The embodiments of the solutions disclosed herein provide significant improvement of current approaches. Under the current approaches, 3DS DIMMs are treated as a single monolithic unit that doesn't consider the temperature characteristics of individual DRAM dies. The current approaches address thermal issues in a reactive manner, which focuses on reducing or limiting any further increase in the temperature of DIMMs/DRAM chips. For example, this is done by either memory throttling, which reduces the rate of memory accesses to the package as whole or by increasing the rate of cooling by boosting the fan's speed or by increasing the circulation rate of the coolant.

In addition to 3DS DIMMs, the principles and teachings disclosed herein may be applied to other stacked die structures and packages, such as processor-in-memory (PIM) modules. (PIM modules may also be called compute on memory modules or compute near memory modules.) PIN/Is may be used for various purposes but are particularly well-suited for memory-intensive workload such as but not limited to performing matrix mathematics and accumulation operations. Under PIM module (which are sometimes called PIM chips when the stacked die structures are integrated on the same chip), the processor or CPU and stacked memory structures are combined in the same chip or package. Generally, the principles and techniques described above for the 3DS DRAM DIMMs may be applied in similar manners to PIM modules.

Figure 12A:
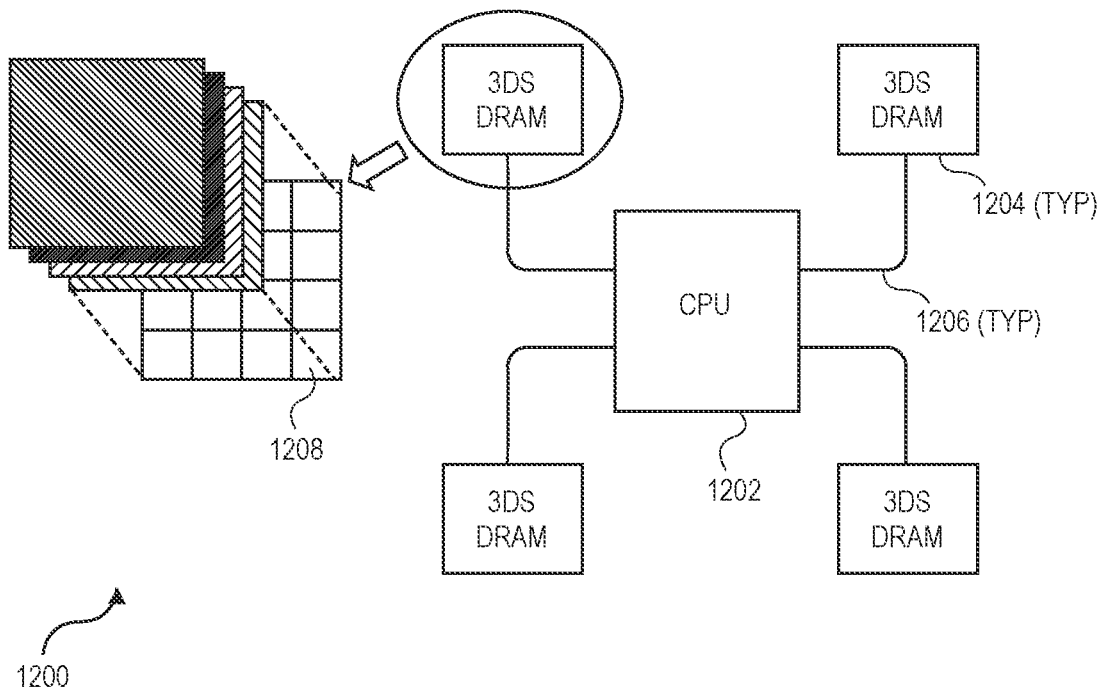
FIG. 12a shows an example of a PIM module.
Figure 12B:
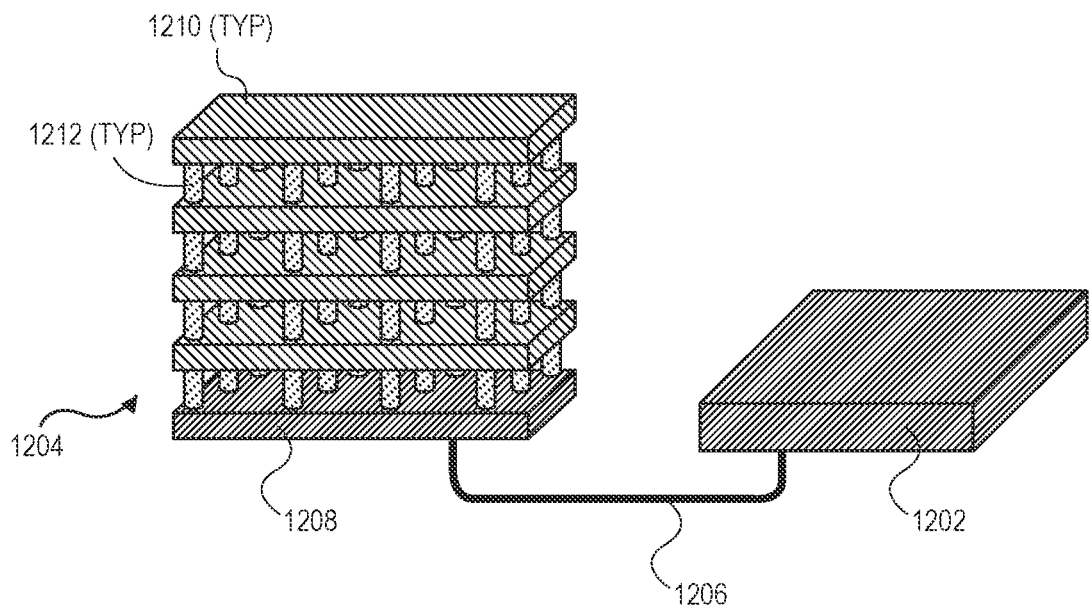
FIG. 12b shows further details of the structure of a PIM module.

An example of a PIM module 1200 is shown in FIGS. 12*a* and 12*b*. PIM module 1200 includes a CPU 1202 coupled to 3DS DRAMs 1204 via respective memory channels 1206, observing there may be multiple memory channels coupled between a CPU and 3DS DRAM. As shown in the blow-up detail, a 3DS DRAM includes a logic layer 1208 above which multiple DRAM dies 1210 are stacked. Logic layer 1208 and DRAM dies 1210 are interconnected by through-silicon vias (TSVs) 1212.

An aspect of PIM modules is that the logic layer may perform compute operations that are separate from the compute operations performed by the CPU. In some instances, the logic layer comprises a processor die or the like. In this case, the logic layer may be significantly hotter than one or more of the DRAM die layers.

In addition to thermal characteristics of DRAM die layers, other thermal characteristics may be considered. For example, it is known that memory nearer the upper edge and sides of a DIMM generally receive higher airflow and operate at lower temperatures than memory that is away from the upper edge and sides. Accordingly, memory allocations may further consider these thermal characteristics in one embodiment.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by a processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer).

For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software/firmware running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for allocating memory in a module employing 3DS (three dimensional stacked) DRAMs (Dynamic Random Access Memories) comprising stacked DRAM dies, comprising:
    mapping memory address ranges to DRAM dies in the module based at least on a layer of the DRAM dies and thermal dissipation characteristics of the DRAM die layers.

2. The method of claim 1, wherein the module comprises a 3DS DRAM DIMM (Dual In-line Memory Module) or a processor-in-memory (PIM) module.

3. The method of claim 1, further comprising:
    associating DRAM dies in respective layers in the 3DS DRAMs with respective memory ranks; and
    assigning respective address ranges in a system memory space to each of a plurality of memory ranks.

4. The method of claim 3, further comprising:
    assigning thermal scores to respective memory ranks based on thermal dissipation characteristics of the die layer to which the ranks are associated; and
    grouping memory ranks with similar thermal scores to occupy contiguous address ranges in a system memory map.

5. The method of claim 4, further comprising:
    exposing table entries with address ranges and corresponding thermal scores to enable software entities to access the table entries.

6. The method of claim 4, wherein the operations of assigning the thermal scores and grouping the memory ranks are performed by BIOS firmware in a compute system in which the module is installed.

7. The method of claim 1, further comprising:
    receiving a memory allocation request from a virtual machine (VM) or application with a requested memory size and memory access rate;
    based on the memory access rate, identifying a memory address range within a table including entries with memory address ranges and corresponding thermal indicia to identify a memory range suitable for the memory access rate; and
    allocating one or more chunks of physical memory from the memory address range that is identified to the VM or application.

8. The method of claim 1, wherein the method is implemented in a system including the module and a processor on which a hypervisor and operating system are executed, further comprising:
    initially allocating memory associated with a first memory range to a virtual machine (VM) or application running on the system;
    detecting an increase in memory access rate for the VM or application;
    identifying a second memory range having better thermal dissipation than the first memory range; and
    migrating memory utilized by the VM or application from the first range to the second range.

9. The method of claim 1, further comprising allocating chunks of the memory address ranges to virtual machines (VMs) and/or applications based on a memory access rate of the VMs and/or applications and the thermal dissipation characteristics of the DRAM die layers.

10. The method of claim 9, further comprising:
    performing memory interleaving under which memory chunks are distributed at one or more of a memory controller level, a memory channel level, and a memory rank level.

11. A compute system, comprising:
    a plurality of 3DS (three dimensional stacked) DRAM (Dynamic Random Access Memory) DIMMs (Dual In-line Memory Modules), each having a plurality of DRAM devices having a stacked DRAM die structure;
    a central processing unit (CPU) having one or more memory controllers coupled to the plurality of 3DS DRAM DIMMs;

BIOS firmware, stored in a storage device in the system and configured to be executed on the CPU to enable the compute system to:
  associate DRAM dies in respective layers in the 3DS DRAM devices with respective memory ranks; and
  assign address ranges in a system memory map to the plurality of memory ranks.

12. The compute system of claim 11, wherein execution of the BIOS firmware on the CPU further enables the compute system to:
  assign thermal scores to respective memory ranks based on thermal dissipation characteristics of the die layer to which the ranks are associated; and
  group memory ranks with similar thermal scores to occupy contiguous address ranges in the system memory map.

13. The compute system of claim 12, wherein execution of the BIOS firmware on the CPU further enables the system to:
  populate a table with entries comprising memory address ranges and corresponding thermal scores indicating a relative level of thermal dissipation provided by levels of DRAM dies associated with the memory address ranges.

14. The compute system of claim 13, further comprising software including at least one of a hypervisor and operating system at least one Virtual Machine (VM) and application to be executed on the CPU, wherein execution of at least one of the hypervisor and operating system enable the system to:
  receive a memory allocation request from a VM or application with a requested memory size and memory access rate;
  identify a memory address range within the table suitable for the memory access rate; and
  allocate one or more chunks of physical memory from the memory address range that is identified to the VM or application.

15. The compute system of claim 14, wherein the one or more chunks of physical memory that are allocated to the VM or application are associated with a first memory range, and wherein execution of the software further enables the compute system to:
  detect an increase in memory access rate for the VM or application;
  identify a second memory range having better thermal dissipation than the first memory range; and
  migrating memory utilized by the VM or application from the first memory range to the second memory range.

16. One or more non-transitory machine-readable mediums having instructions stored thereon configured to be executed on a central processing unit (CPU) of a compute system including a plurality of 3DS (three dimensional stacked) DRAM (Dynamic Random Access Memory) DIMMs (Dual In-line Memory Modules), each having a plurality of DRAM devices having a stacked DRAM die structure, the CPU having one or more memory controllers coupled to the plurality of 3DS DRAM DIMMs, wherein execution of the instructions enables the compute system to:
  map memory address ranges to DRAM dies in the plurality of 3DS DRAM DIMMs based at least on a layer of the DRAM dies and thermal dissipation characteristics of the DRAM die layers.

17. The one or more non-transitory machine-readable mediums of claim 16, wherein execution of the instructions further enables the compute system to:
  associate DRAM dies in respective layers in the plurality of 3DS DRAM DIMMs with respective memory ranks;
  assign thermal scores to respective memory ranks based on thermal dissipation characteristics of the die layer to which the memory ranks are associated; and
  group memory ranks with similar thermal scores to occupy contiguous address ranges in the system memory map.

18. The one or more non-transitory machine-readable mediums of claim 17, wherein execution of the instructions further enables the compute system to:
  populate a table with entries comprising memory address ranges and associated thermal scores indicating a relative level of thermal dissipation provided by levels of DRAM dies associated with the memory address ranges.

19. The one or more non-transitory machine-readable mediums of claim 18, wherein execution of the instructions further enables the compute system to:
  receive a memory allocation request from a virtual machine (VM) or application running on the compute system with a requested memory size and memory access rate;
  identify a memory address range within the table suitable for the memory access rate; and
  allocate one or more chunks of physical memory from the memory address range that is identified to the VM or application.

20. The one or more non-transitory machine-readable mediums of claim 19, wherein the one or more chunks of physical memory that are allocated are associated with a first memory range, and wherein execution of the instructions further enables the compute system to:
  detect an increase in memory access rate for the VM or application;
  identify a second memory range having better thermal dissipation than the first memory range; and
  migrate memory utilized by the VM or application from the first range to the second range.

* * * * *